July 3,395,331

...HARMONIC GENERATING STRUCTURE

Filed Sept. 16, 1963      2 Sheets-Sheet 1

INVENTOR.
ELIAS SNITZER
BY John A. Harvey
ATTORNEY

INVENTOR.
ELIAS SNITZER
BY John A. Harvey
ATTORNEY

United States Patent Office 3,395,331
Patented July 30, 1968

3,395,331
OPTICAL FREQUENCY HARMONIC
GENERATING STRUCTURE
Elias Snitzer, Sturbridge, Mass., assignor to American
Optical Company, Southbridge, Mass., a corporation of
Delaware
Filed Sept. 16, 1963, Ser. No. 309,170
2 Claims. (Cl. 321—69)

ABSTRACT OF THE DISCLOSURE

Fiber optical waveguide means employing materials of different refractive indices and different coefficients of thermal expansion for converting optical energy of one frequency into optical energy of a harmonic frequency.

This invention relates to lasers, and in particular to devices for converting the output of a laser to optical energy at a harmonic of the laser emission line.

Laser devices typically provide a coherent, monochromatic light output of very high intensity ond narrow beam spread. The utilization of this output to produce monochromatic optical energy at the second harmonic of the laser emission line has been proposed by P. A. Franken, A. E. Hill, C. W. Peters, and G. Weinreich, in an article entitled "Generation of Optical Harmonics," 7 Phys. Rev. Letters 118 (1961). It is there explained that due to the extraordinary intensity of the monochromatic laser emission, optical harmonics can be produced by directing such emission through a suitable light-transmissive material (herein termed a frequency-doubling material or, more generally, a harmonic-generating material). By way of specific example, the authors report that the monochromatic (6943 A.) output of a ruby laser, focused through a crystalline quartz sample, generates detectable optical energy at the second harmonic (about 3472 A.) of the ruby laser emission.

The cited article further explains that for generation of second-harmonic light the dielectric polarization of the frequency-doubling material must be a non-linear function of the electric field due to the incident laser light, and specifically that the quadratic terms of this function must be non-vanishing. Hence the frequency-doubling material must lack a center of inversion. It is also demonstrated in the cited article that the intensity of the generated second-harmonic light is directly related to the expression $$I \alpha \left( \frac{n_h}{n_h - n_f} \right) \lambda$$

wherein $n_f$ and $n_h$ are the respective indices of refraction of the frequency-doubling material for the laser light and the second-harmonic light, and $\lambda$ is the second-harmonic wavelength. As will therefore be appreciated, to employ the above described frequency-doubling arrangement as a useful source of monochromatic optical energy of wavelength corresponding to the second-harmonic of a given laser emission line, it is important the indices $n_f$ and $n_h$ approach identity.

More generally, for the production of any desired harmonic of laser-light energy, including third and higher harmonics, the harmonic-generating material must have a non-linear dielectric coefficient, and must be transmissive to light of both the fundamental and harmonic frequencies (it being understood that the term "light" as used herein refers to electromagnetic energy extending over the approximate band of frequencies from infrared to ultraviolet and beyond). Since all dielectrics are non-linear in sufficiently high intensity fields (such as the electric fields of the very intense light output of lasers), a number of materials are suitable for such harmonic generation. As mentioned above, to generate second and higher even harmonics the harmonic-generating material must lack a center of inversion, but this property is not requisite for the generation of third and higher odd harmonics. However, for the production of any desired harmonic (either even or odd) it is important that the refractive index of the harmonic-generating material for the harmonic-frequency light be substantially the same as that for the fundamental-frequency light.

The present invention relates to a device for converting laser output light to light of second or higher harmonic frequency wherein the harmonic-generating element is an optical waveguide, such as an optical fiber. A typical optical waveguide is a body of light-transmissive material providing an elongated light propagation path of small cross-sectional area. The frequencies that will propagate through the wave-guide, and the modes of propagation in the waveguide that will be excited by particular frequencies, are determined by the parameters of the waveguide structure. The boundaries of the waveguide are the side surfaces of the transmissive body, which are surrounded by material (such as air, or a suitable cladding) having a lower index of refraction than the material comprising the body, to provide so-called total internal reflection at the interface.

In the device of the present invention, the output light of a laser is focused (as by a suitable arrangement of lenses) upon an end surface of the harmonic-generating waveguide, so that the laser output light propagates through the waveguide body. The "light-pipe" action of the internally reflective waveguide side surfaces concentrates the laser light in the waveguide body over a long distance, enabling the harmonic-generating effect to occur in a larger volume than is possible in an effectively unbounded light propagation path through an ordinary sample of harmonic-generating material.

Theoretically, the amount of second or higher harmonic light produced in a harmonic-generating material is a function of the product of the fundamental-light intensity and the cross-sectional area through which the light passes. Since an optical system does not change the magnitude of this product, it might seem that no particular advantage would inhere in focusing the laser output light into a small cross-sectional area. However, the theoretical functional relation expressed above presupposes perfect uniformity of the harmonic-generating material, whereas in practice such materials are non-uniform. Focusing the laser light into a small cross-sectional area provides a substantial advantage in overcoming the lack of uniformity of the harmonic-generating material; and the optical waveguide structure serves to preserve this high light intensity over a long path.

In the waveguide structure, the refractive indices of the harmonic-generating material for the laser light and the generated harmonic light may not be the same in any single mode of propagation. However, for a given wavelength of light, each mode has its own effective index of refraction. Accordingly, by appropriate design of the fiber, individual modes for the fundamental and harmonic light can result in which the respective effective indices of refraction (for the respective wavelengths) are substantially identical. In order words, with the fiber so designed that the energies of the fundamental and the harmonic frequencies are coupled into appropriate separate modes, the phase velocities for these two wavelengths can be matched. It is in this manner that the present invention overcomes the difficulty of providing a material in which the indices $n_f$ and $n_h$ approach identity as is desirable to attain high intensity of generated harmonic light.

To realize the foregoing advantages of an optical waveguide structure for frequency multiplying, it is necessary that the waveguide body be fabricated of a material that can provide the desired harmonic-generating effect. Conventional optical waveguides, however, are fabricated of materials such as glass, which have a center of inversion and are accordingly unsuitable for efficient generation of second and higher even-order harmonics. Hence an important aspect of the present invention resides in the provision of an optical waveguide formed of a material lacking a center of inversion and thus useful in the generation of even-order optical harmonics of the light output of a laser.

As mentioned above, third and higher harmonics of the laser output light, as well as second-harmonic light, may be obtained with the present invention. For the production of any of these harmonics, it is important to match the indices of refraction for the desired harmonic light and the fundamental-frequency light in the harmonic-generating material. However, since the requirement that the material lack a center of inversion applies only to the generation of even-order harmonics, it is feasible to use a glass fiber in the device of the present invention for the generation of third and higher odd-order harmonic light, if the fiber is appropriately designed to match the phase velocities for the odd-order harmonic and fundamental frequencies.

Further features and advantages of the invention will be apparent from the detailed description hereinbelow set forth, together with the accompanying drawings, wherein.

Figure 1:
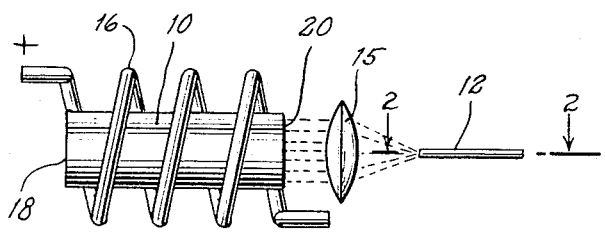
FIG. 1 is an elevational view schematically illustrating an optical arrangement of elements embodying the present invention in a particular form.
Figure 6:
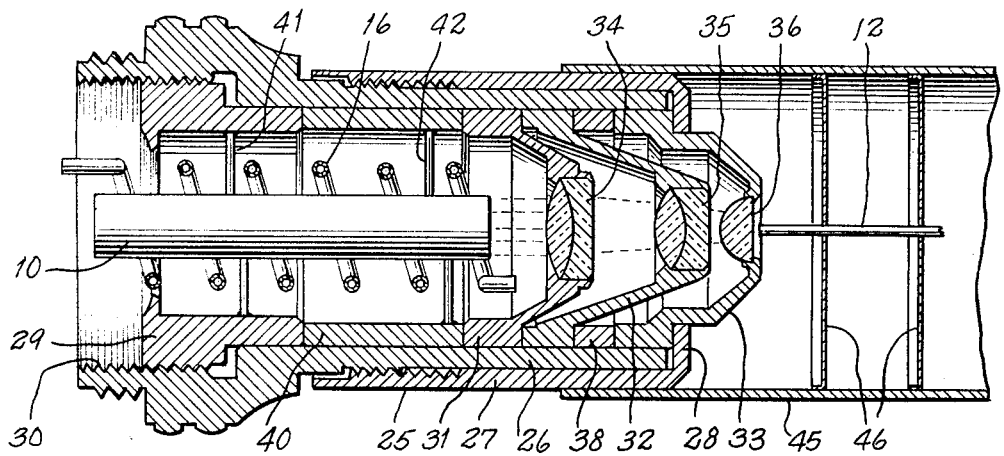
Figure 5:
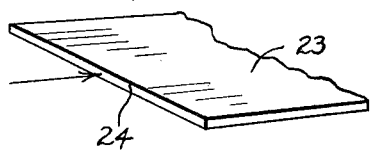
Figure 3:
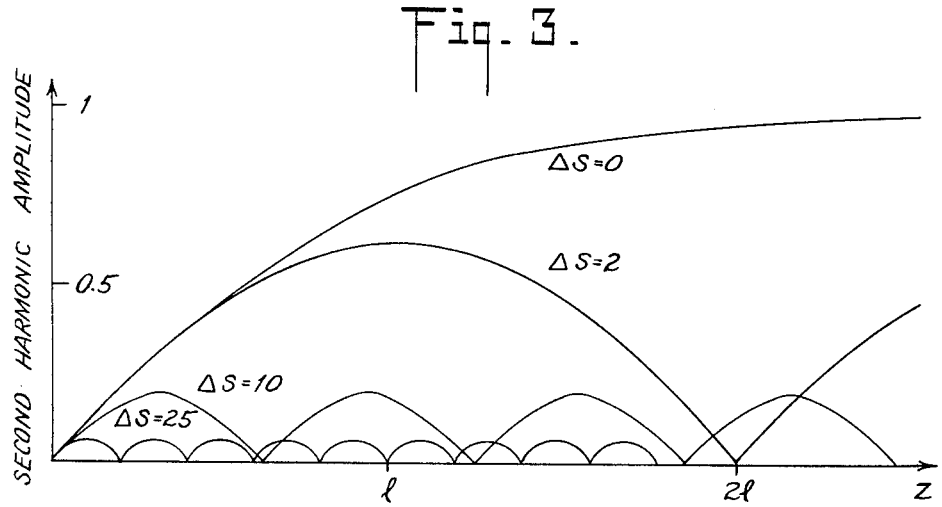
Figure 4:
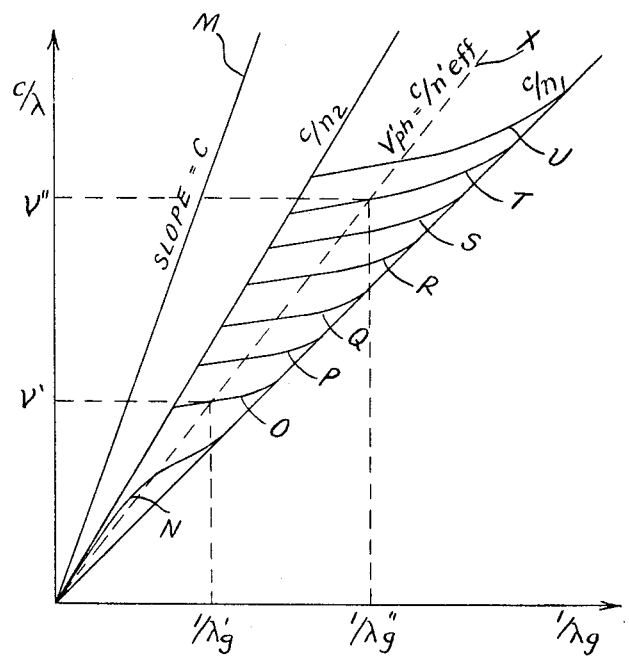

FIG. 3 graphically represents certain characteristics of harmonic-frequency light energy generation in harmonic-generating materials;

FIG. 4 is a schematic graphical representation of certain operating characteristics of the harmonic-generating element of the embodiment of FIG. 1;

FIG. 5 is a schematic perspective view of an alternative form of waveguide suitable for use in the device of FIG. 1; and FIG. 6 is an elevational view, partly in cross-section, illustrating details of structure incorporated in the embodiment of FIG. 1.

Figure 2:
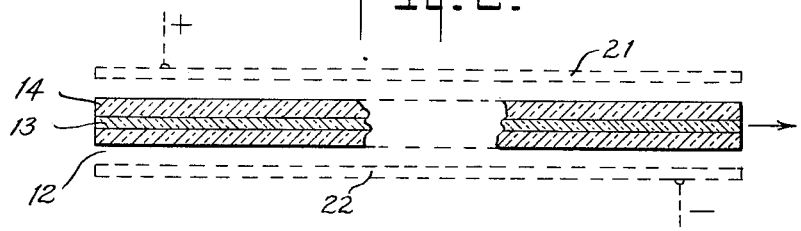
FIG. 2 is a cross-sectional view of the optical waveguide of FIG. 1, taken along the plane 2—2 of FIG. 1.

Referring first to FIG. 1, there is shown a cylindrical laser rod 10 of conventional design fabricated of a solid laser material such as crystalline ruby, and disposed in spaced coaxial relation to an optical fiber 12. As shown more particularly in FIG. 2, the fiber 12 comprises a light-transmissive core 13 surrounded by a cladding 14 of material having an index of refraction lower than that of the core material to provide total internal reflection at the core-cladding interface. Energy emitted from the laser rod 10 is focused by a suitable lens arrangement 15 onto the proximate end of the fiber core 13 for propagation through the core.

To constitute a complete, operative laser structure, the rod 10 is surrounded concentrically by a helical gaseous discharge flash tube 16 (of a type conventionally used to provide pumping light energy for solid-state lasers), and has reflectively coated plane parallel end faces 18, 20, providing internally reflective terminii of an optical resonant cavity coextensive with the rod. The rod end face 18 is fully reflective, but the end face 20 is made partially light-transmissive to permit emission of the laser light output therethrough. In addition, the rod and flash tube are associated with further conventional laser device elements (not shown) such as a flash tube electrical power source connected to the end electrodes of the tube 16, and a trigger electrode encircling the turns of the flash tube and energized by an electrical potential pulse to initiate gaseous discharge in the flash tube when sufficient charge energy has been developed in the power source.

The operation of the above described laser structure will be readily apparent. In accordance with conventional lasering principles, laser light is produced in the laser rod by photonic emission from active atoms of the laser material, occurring incident to the transition of the atoms from an excited upper energy level to a terminal low energy level. Specifically, lasering action can occur when the difference between the upper-level population and the lower-level population in the rod equals or exceeds a so-called threshold value, which is dependent on energy-loss factors in the resonant cavity structure. This condition is termed a laserable inversion of energy states of the rod. Initiation of gaseous discharge in the flash tube serves to create the requisite upper-level population by producing a pulse of light energy (including energy in wavelengths of at least one absorption band of the laser material) which enters the laser rod and excites active atoms of the laser material to shift in a series of interlevel transitions from an initial low energy level to the aforementioned upper level. Light produced by spontaneous emissive transitions of individual upper-level atoms to the terminal low energy level in the rod then reflects back and forth through the rod between the cavity ends and induces similar light-emissive transitions of other upper-level atoms in such manner as to create a fast-rising bidirectionally reflected beam of coherent, monochromatic light within the rod. A portion of this latter beam emerges through the partially transmissive rod end 20 in one or a succession of high-intensity laser output light pulses, continuing until the inversion of energy states in the rod falls again below the threshold value.

This monochromatic laser output (typically in the red or infrared range) is focused by the lens system 15 onto the end of the fiber core 13 and is concentrated by the light-pipe action of the internally reflective core boundary so that it propagates longitudinally through the core and emerges from the far end of the core. As a particular feature of the invention for generation of second or higher-order even harmonics, the core 13 comprises a material lacking a center of inversion and capable of providing significant generation of second or higher-order even harmonic light. Consequently, passage of the high-intensity laser output therethrough generates optical energy at the second or higher-order even harmonic of the laser emission line. This harmonic energy also emerges through the far end of the core. If it is desired to obtain third or higher-order odd harmonics of the laser output light, it is not necessary that the core 13 comprise a material lacking a center of inversion although the harmonic-generating material used should be selected to provide significant conversion of laser light to light of the desired odd harmonic frequency.

As will be more particularly understood, the harmonic-generating material of the core 13 exhibits a non-linear response to the high-intensity electric field of the incident laser light. It is this nonlinearity of the harmonic-generating material that converts the fundamental-frequency laser light to energy of the desired harmonic frequency as the laser light propagates through the material. The amplitude of the produced harmonic-frequency energy is directly dependent on the intensity of the incident fundamental-frequency light, and thus the high intensity of the laser emission theoretically enables production of a desirably large-amplitude harmonic energy output.

However, the amplitude of the generated harmonic energy is, as explained above, also inversely dependent on the difference between the indices of refraction of the harmonic-generating material for light of the fundamental and harmonic frequencies. If these indices were identical, the phase velocities of the two light energies in the material would be exactly matched and all the energy of fundamental frequency would theoretically be transferred to the harmonic frequency; that is to say, the amplitude of the produced harmonic (as a function of the length of the light propagation path through the harmonic-generating material) would approach the intensity of the incident laser light asymptotically. Generally, in harmonic-generating materials the two indices are not identical and the consequent disparity in phase velocities (or degree of phase mismatch) reduces the proportion of energy transferred from fundamental to harmonic. In addition, there is a cross-transfer of energy between the fundamental and harmonic frequencies which creates successive maxima and minima of harmonic-energy amplitude along the length of the propagation path through such non-ideal harmonic-generating materials.

This relation between harmonic-energy amplitude and degree of phase mismatch (for the specific case of second-harmonic generation) is represented graphically in FIG. 3, which is reproduced from a paper by N. Bloembergen entitled "Wave Propagation in Nonlinear Electromagnetic Media," 51 Proc. IEEE 124–31 (January 1963). In FIG. 3, the second-harmonic amplitude (as a fraction of the amplitude of the incident fundamental-frequency light) for varying degrees of phase mismatch $\Delta S$ is plotted as a function of the length Z of the light propagation path through the harmonic-generating material. It will be seen that the maximum amplitude of generated harmonic energy, and also the distance between successive maxima and minima along the length of the path, increases as $\Delta S$ decreases, or in other words as the phase velocities of the two light energies approach identity in the harmonic-generating material.

In the present invention, as exemplified by the structure of FIG. 1, close phase-velocity matching to provide optimum conversion of incident laser light to harmonic-frequency light is achieved by the construction of the fiber 12 incorporating the core 13 of harmonic-generating material. To this end, and although the refractive indices of the latter material for the two light energies are ordinarily different, the fiber is so constructed that the energies of the laser output and the desired harmonic light are coupled into two individual and different modes of propagation in the core 13 and it is these different modes which enable the effective indices of refraction of the fundamental and harmonic energies to be substantially identical. Specifically, the core radius and the indices of refraction of the core 13 and cladding 14 are chosen such that the modes excited at the fundamental and harmonic frequencies have for the respective frequencies substantially the same effective index of refraction. Provision of the appropriate core and cladding indices is readily achieved by proper selection of the core and cladding materials. The manner in which the selection of these several parameters is accomplished will now be considered in more detail.

At the outset, it may be explained that when the transverse dimensions of an optical dielectric waveguide (such as the fiber core 13 of FIG. 1) are comparable to the wavelength of the light which it is desired to propagate, only certain propagation modes will satisfy Maxwell's equations and the prevailing boundary conditions. Light can propagate with negligible attenuation through the waveguide only in the latter modes, which are determined in particular by the transverse dimension of the waveguide core and the waveguide boundary conditions established by the respective refractive indices of the core and cladding.

For each propagation mode in the waveguide, for light energy of free-space wavelength $\lambda$ and frequency $\nu = c/\lambda$ (where $c$ is the free-space velocity of light), there exists a guide wavelength $\lambda_g$ and an effective index of refraction $n_{\text{eff}}$ which determines the phase velocity of $V_{\text{ph}}$ of the light in such mode in accordance with the relation $$v_{\text{ph}} = \nu\lambda_g = c/n_{\text{eff}}$$

In general, different modes will provide different values of $n_{\text{eff}}$ for light of given frequency $\nu$. Thus, and although in the fiber core 13 light energies of the laser output frequency and the desired harmonic frequency do not have the same phase velocities in any single mode, the effective index of refraction for the fundamental-frequency laser light in one mode in the fiber 12 may be made to be substantially equal to the effective index of refraction for the harmonic-frequency energy in a second mode in the fiber. Since $c$ is a constant, this means that the phase velocities of the two energies in the respective modes will then be substantially identical, thereby providing generation of harmonic light of advantageously superior intensity.

FIG. 4 represents graphically, in relation to the frequency $\nu$ of the various frequency components of light to be propagated by an optical fiber waveguide of given parameters (such as the clad fiber 12) and the corresponding inverse guide wavelengths $1/\lambda_g$ of these frequency components in the fiber, the various propagation modes which may exist for a core refractive index $n_1$ and cladding refractive index $n_2$. The scale relationship between the axes of ordinates and abscissae is represented by curve M of slope $c$. As explained more fully in a paper by E. Snitzer entitled "Cylindrical Dielectric Waveguide Modes," 51 J. Opt. Soc'y. Amer. 491–98 (May 1961), curves N–U represent schematically propagation modes of increasingly higher order from the lowest-order ($HE_{11}$) mode represented by curve N to the highest-order propagation mode here shown and represented by curve U. Propagation in these various modes is such as to be confined to the region between lines having slopes $c/n_1$ and $c/n_2$. Each mode as a function of $1/\lambda_g$ is represented by a curve which approaches the $c/n_1$ line far from waveguide cutoff and terminates at the $c/n_2$ line at waveguide cutoff. All of the modes having cutoffs terminate sharply at the $c/n_2$ line; that is to say, in any given mode having a cutoff light can propagate only if its frequency is higher than the frequency coordinate $\nu$ of the cutoff point (intersection with line $c/n_2$) of the mode curve. The $HE_{11}$ mode, which does not have a cutoff, approaches the $c/n_2$ line slowly and finally merges with it at the origin.

Consider a laser light output of frequency $\nu'$ to be converted to harmonic energy of frequency $\nu''$ (an integral multiple of $\nu'$) in the fiber 12 of FIG. 1. In the schematic graph of FIG. 4, let mode curve O contain a point defined by the coordinates $(\nu', 1/\lambda'_g)$. This means that light of the fundamental frequency $\nu'$ will propagate in the mode represented by curve O with a guide wavelength $\lambda'_g$. The phase velocity $V'_{\text{ph}}$ of such light in such mode is given by the slope of a linear curve X connecting the point $(\nu', 1/\lambda'_g)$ with the origin of the graph. The slope of the latter line is $c/n'_{\text{eff}}$ (a value intermediate $c/n_1$ and $c/n_2$), where $n'_{\text{eff}}$ is the effective index of refraction in the mode represented by curve O for light of frequency $\nu'$.

Now suppose that the harmonic frequency ordinate $\nu''$ intersects the mode curve T representing a higher-order propagation mode at a point $(\nu'', 1/\lambda''_g)$ also lying on curve X. In such case, light of frequency $\nu''$ propagates in the mode represented by curve T with a guide wavelength $\lambda''_g$ and with the same effective index of refraction $n'_{\text{eff}}$ and phase velocity $v'_{\text{ph}}$ (given by the slope of curve X) as does the light of fundamental frequency $\nu'$ propagating in the mode represented by curve O. It will be noted that light of fundamental frequency $\nu'$ does not propagate in the mode of curve T (because $\nu'$ is below the cutoff frequency of the latter mode), and that while light of harmonic frequency $\nu''$ does propagate in the mode of curve O it does so with reduced energy coupling to the fundamental frequency since its phase velocity is then different from $v'_{\text{ph}}$ as indicated by the fact that the intersection of ordinate $\nu''$ and mode curve O (at a point very close to the $c/n_1$ line) is not on curve X.

The desired phase-matching in the fiber 12 is thus attained by selecting the core parameters and such core and cladding materials for the fiber as to provide appropriate indices of refraction so that the propagation modes supported by the fiber include two modes in which light of tthe fundamental and desired harmonic frequencies will propagate at substantially the same effective phase velocities and thus have substantially the same effective indices of refraction. In this respect, note in connection with FIG. 4 that the positions of the propagation-mode curves shift with variation of either index of refraction $n_1$ or $n_2$ (or both) or with variation of the core parameters. For given core parameters and index of refraction, therefore, phase matching generally may be accomplished by selection of the cladding material to provide an appropriate value of index of refraction $n_2$. Since the factors subject to selection have interrelated effects, initial selections are facilitated by a graph of the FIG. 4 type constructed in the manner explained in the above mentioned Snitzer paper which explains in detail how the propagation mode characteristics of an optical dielectric waveguide are determined by the core radius and core and cladding refractive indices.

The length of the fiber core 13 is normally of a higher order of magnitude than the transverse dimension of the core, and indeed is preferably larger by several orders of magnitude than such transverse dimension, to provide a greatly elongated wave energy propagation path. The length of the fiber aids in conversion of the laser emissive energy to the desired harmonic light. While there is some attenuation of energy at reasonable lengths, such loss is not material so long as the effective indices of refraction for the two wavelengths are sufficiently close to provide conversion of energy in excess of the losses. The usual fiber length selected represents a compromise between the opposing factors involved to obtain reasonable energy conversion without excessive losses.

The foregoing described fiber construction is generally applicable to the production of energy at any desired (even or odd) harmonic frequency. However, to generate second or higher even harmonics, it is necessary that the harmonic-generating fiber core 13 be fabricated of a material lacking a center of inversion. The fiber core 13 of the present invention, as used for the production of second and higher even harmonics, may be provided by a variety of structures. A presently preferred fiber construction employs a glass core 13 and a glass cladding 14 wherein the core glass has a thermal coefficient of expansion different from that of the cladding. The difference in coefficients of expansion between core and cladding sets up strains that introduce birefringence and, particularly where the difference in coefficients of expansion is sufficiently large, can create a large strain gradient in the region of the interface. Although birefringence of itself would not produce even-order harmonic frequencies (for example, a uniform strain while producing birefringence would not produce a structure lacking a center of inversion), a strain gradient does provide a structure lacking a center of inversion and hence having the desired harmonic frequency generating property.

Another suitable fiber construction comprises a crystalline fiber core fabricated of a suitable material which lacks a center of inversion, such as quartz formed for example by grinding and polishing a body of crystalline quartz or by the growth of whiskers, and potted in a suitable clear glass cladding for ease of handling. Alternatively, a clad glass core of appropriate composition may be devitrified to provide a crystalline body lacking a center of inversion. Again, a hollow cladding 14 may be prepared, and an appropriate crystal then grown in the void in the center of such cladding to constitute a core lacking a center of inversion. As a further alternative, the core 13 may be constituted of a material that crystallizes into natural fiber optic configurations and that lacks a center of inversion.

A still further alternative involves application of a direct current biasing electric field to a clad glass fiber. For creation of such a field, the fiber 12 is positioned between elongate condenser plates 21, 22, indicated by broken lines in FIG. 2. As explained in the Franken et al. paper mentioned above, glass subjected to a strong bias field lacks a center of inversion; accordingly, by energization of the plates 21, 22, during the period of operation of the device of FIG. 1, the requisite property of the fiber is achieved.

Similarly, a hollow cladding 14 may be filled with a light-transmissive liquid exhibiting a large Kerr effect and be positioned between the plates 21, 22. With the plates energized, the liquid lacks a center of inversion and may be used as a liquid harmonic frequency generating fiber in the present invention. Since many liquids become conductive under such conditions, and since this conductivity would make the liquid fiber core unsuitable for harmonic frequency generation, a liquid which does not become thus conductive should be used or the effect of its conductivity should be avoided by use of a high-frequency electric field to create the desired property in the liquid.

Although the structure of FIG. 1 is shown as incorporating a clad optical fiber 12, it will be appreciated that other forms of optical waveguide structure (fabricated of material either having or lacking a center of inversion) may be employed. For example, the cladding 14 is not optically necessary to provide total internal reflection at the side surfaces of the core 13, since the core may merely be suspended in air which has a lower index of refraction than the core material. Hence an unclad fiber of material either having or lacking a center of inversion could be used, although the cladding is ordinarily desirable to provide adequate mechanical strength for the core 13 which in practice is usually very long with respect to its diameter.

As shown in FIG. 5, the waveguide may comprise a thin plate 23 of material either having or lacking a center of inversion and of thickness comparable to the diameter of the fiber core 13 to provide a light propagation path preferably longer by several orders of magnitude than such thickness. The laser output is focused upon an edge 24 of the plate and propagates through the plate, whose opposed face surfaces have total internal reflection by reason of the use of a face cladding material or because they are exposed to the air. As before, harmonic light is generated in the waveguide and by proper choice of the waveguide parameters (thickness and refractive index or refractive indices where face cladding is used) the laser output and harmonic light are coupled into individual modes in which they have substantially the same effective index of refraction.

It will also be understood that the form of laser incorporated in the structure of FIG. 1 is exemplary only, and that other types of lasers may be used (for example solid laser elements fabricated of neodymium-doped glass), arranged so that the laser output is focused into the waveguide fiber 12 of FIG. 1. In particular, lasers constituted of gaseous laser material may be employed, notwithstanding that the light output of a gas laser is ordinarily of substantially lower intensity than that of a solid-state laser. The suitability of gas lasers for frequency-doubling operation is discussed in the cited article of Franken et al., which reports that the intensity of the generated second-harmonic light is dependent on the coherence characteristics of the laser employed, and that gas lasers have particularly favorable coherence characteristics.

Referring now to FIG. 6, there is shown in more detail a particular structure incorporating the embodiment schematically illustrated in FIG. 1 and including a specific arrangement of lenses for focusing the laser output onto the proximate end surface of the harmonic-generating fiber 12. The supporting structure for the device, generally designated 25, comprises a hollow cylindrical member 26 and an outer cap 27, which as shown is threaded onto the cylinder 26 and has an end flange 28. A screw-threaded nipple 29 is screwed into a cap opening 30 in the cylinder 26. Between the nipple 29 and flange 28 are positioned a series of lens supports 31, 32 and 33, in which are mounted respectively lenses 34, 35 and 36, the latter lens being (as shown) preferably of hemispherical configuration. The lens supports 32 and 33 are separated by a spacing ring 38, while the lens support 31 is spaced from the nipple 29 by a sleeve or spacing ring 40. This arrangement of lenses may be characterized as constituting a reversed form of microscope objective lens system.

The laser rod 10 is supported within the outer cylindrical structure, mounted on brackets 41 and 42, with the helical flash tube 16 fixedly positioned to surround the rod 10. The inner surface of those portions of the structure 25 surrounding the laser rod and flash tube are preferably of polished, reflective character, to concentrate the pumping light energy emitted from the flash tube onto the surface of the laser rod for optimum pumping efficiency. A sleeve 45 is slipped over the end of the cap 27 and has supporting brackets 46 which carry the harmonic-generating fiber 12 in coaxial relation with the above-described lens system and the rod 10, so that the output light of the rod is directed by the lenses onto the proximate end surface of the fiber core.

It is to be understood that the present invention is not limited to the specific features and embodiments hereinabove set forth, but may be carried out in other ways without departure from its spirit.

I claim:
1. An optical frequency harmonic-generating waveguide adapted to be supplied with coherent laser energy of a preselected fundamental frequency for conversion to and propagation of optical energy of a higher predetermined harmonic frequency, said waveguide being in the form of an elongated optical fiber comprising a core and cladding, said core being fabricated of a solid material which is transmissive of optical energy at said fundamental frequency as well as optical energy at said harmonic frequency, and which material has a given coefficient of thermal expansion and a predetermined index of refraction, said cladding encircling said core throughout the length thereof and being fabricated of a solid material which is transmissive of optical energy at said harmonic frequency and has an index of refraction of a lesser predetermined value than that of said core material, said cladding material having a different predetermined coefficient of thermal expansion than that of said core, said core and cladding together having waveguide propagation parameters and differences in the coefficients of thermal expansion which are such as to establish a plurality of individual modes of propagation of said optical energies traveling longitudinally therein as well as a strain gradient induced birefringence in the region adjacent the core and cladding interface which are such as to produce a conversion of optical energy at said fundamental frequency to optical energy at said harmonic frequency.

2. An optical frequency harmonic-generating waveguide adapted to be supplied with coherent energy of a preselected fundamental frequency for conversion to and propagation of optical energy of a higher predetermined harmonic frequency, said waveguide being in the form of an elongated optical fiber comprising a core and cladding, said core being fabricated of a glass which is transmissive of optical energy at said fundamental frequency as well as optical energy at said harmonic frequency, and which glass has a given coefficient of thermal expansion and a predetermined index of refraction, said cladding encircling said core throughout the length thereof and being fabricated of a glass which is transmissive of optical energy at said harmonic frequency and has an index of refraction of a lesser predetermined value than that of said core glass, said cladding glass having a different predetermined coefficient of thermal expansion than that of said core, said core and cladding together having waveguide propagation parameters and differences in the coefficients of thermal expansion which are such as to establish a plurality of individual modes of propagation of said optical energies traveling longitudinally therein as well as a strain gradient induced birefringence in the region adjacent the core and cladding interface which are such as to produce a conversion of optical energy at said fundamental frequency to optical energy at said harmonic frequency.

References Cited
UNITED STATES PATENTS 3,297,875  1/1967  Garwin et al. _____ 350—96

OTHER REFERENCES

Franken et al., Generation of Optical Harmonics, Phys. Rev. Letters, 7, 4 (Aug. 15, 1961) pp. 118 and 119.

JEWELL H. PEDERSEN, *Primary Examiner.*

W. L. SIKES, *Assistant Examiner.*